United States Patent [19]

Feimer et al.

[11] Patent Number: 4,736,867
[45] Date of Patent: Apr. 12, 1988

[54] CONTAINER LID

[75] Inventors: Bryan A. Feimer, Parma; Henry G. Roethel, Ravenna; Raymond P. Kowalics, Solon, all of Ohio

[73] Assignee: The Meyer Company, Cleveland, Ohio

[21] Appl. No.: 858,390

[22] Filed: May 1, 1986

[51] Int. Cl.⁴ .................. B65D 51/04; B65D 51/24
[52] U.S. Cl. .................. 220/337; 220/85 D; 220/366; 222/356; 222/570
[58] Field of Search .............. 220/85 D, 366, 337; 222/356, 570, 566, 567, 575

[56] References Cited

U.S. PATENT DOCUMENTS

| Re. 8,595 | 2/1879 | Knecht | 222/545 |
| 221,057 | 10/1879 | Hall | 222/566 |
| 980,066 | 12/1910 | Collins | 222/356 |
| 1,079,942 | 12/1913 | Langan | 220/85 D |
| 1,126,564 | 1/1915 | Purinton | 222/567 |
| 1,490,883 | 4/1924 | Baron | 222/545 |
| 1,800,846 | 4/1931 | Slagel | 220/366 |
| 3,120,912 | 2/1964 | Mount | 222/567 |
| 3,999,680 | 12/1976 | Cho | 220/85 D |

FOREIGN PATENT DOCUMENTS

| 20758/29 | of 1929 | Australia | 220/366 |
| 560757 | 9/1957 | Belgium | 220/85 D |
| 249792 | 4/1926 | United Kingdom | 220/85 D |

Primary Examiner—George E. Lowrance
Attorney, Agent, or Firm—Fay, Sharpe, Beall, Fagan, Minnich & McKee

[57] ABSTRACT

A container lid for substantially covering a container opening while receiving a utensil handle therethrough. A recess is formed in the lid to closely receive the utensil handle and a recess cover assembly extends over the recess to reduce the possibility of foreign matter entering the container. A hinge means and a handle means are disposed on the lid for pivotally mounting the lid with respect to the container. A generally tapering flange or rim extends from a lower surface of the lid for close receiving relation with the container opening.

9 Claims, 1 Drawing Sheet

CONTAINER LID

BACKGROUND OF THE INVENTION

This invention pertains to the art of container closures and more particularly to a closure lid for a soup kettle or the like.

The invention is particularly applicable to a soup kettle lid accommodating a ladle or similar utensil therethrough and will be described with particular reference thereto. However, it will be appreciated that the invention has broader applications and may be advantageously employed in other container environments and applications.

Restaurants, hospitals, schools and other institutional users employ fluid containers and kettles with associated lids or closures to keep soup and other liquids warm in a serving line. In the past, the lids have typically been formed from stainless steel and provided with a notched aperture along the outer periphery of the lid to provide clearance for the handle of a soup ladle or other similar utensil. In this manner, the lid can remain in place substantially covering the fluid container opening with the utensil passing therethrough.

With increased use of institutional fluid kettles and similar open containers, concern has been expressed over potential entry of foreign matter into the container. More specifically, a first alternative is to leave the container open without employing any type of lid. This is, of course, the most unacceptable of the options since foreign matter can easily enter the container opening. Additionally, if the fluid retained in the container is to be heated, the fluid is open to the environment and excess energy is required to keep the fluid warm. The only benefit of this first option is that the container is freely accessible.

A second option is to utilize a lid having a notch or recess as described above such that a ladle or similar utensil may be retained in the fluid container opening when the remainder of the opening is covered. Although this offers the advantages of retaining a substantial portion of the heat therein, it still does not completely solve the problem of limiting entry of foreign matter from above the container opening. Contaminants can still pass through the utensil receiving recess and enter the container.

Another option is directed to use of a container lid that completely encompasses the container opening. Although this does prohibit entry of foreign matter into the container, the ladle or similar utensil must, accordingly, be stored exteriorly of the container when the lid is in place. Not only does this require extra space, but the ladle itself is therefore subject to contamination by foreign matter.

The subject invention provides a fluid container lid that provides for the needs of institutional users and overcomes the above-noted problems and others in an economical, efficient manner.

SUMMARY OF THE INVENTION

In accordance with the present invention, there is provided a container lid that effectively covers a container opening with provision for a utensil handle or the like therein.

According to an aspect of the invention, the container lid includes a first cover surface having an outer periphery greater than the associated container opening dimension. The surface has means for receiving an associated utensil handle comprising a recess extending radially inwardly from the outer periphery. A sidewall extends generally perpendicularly from a recess edge and an overlay portion is connected to the sidewall for spaced, covering relation with the recess.

According to another aspect of the invention, handle means extend generally normally outward from the surface for facilitating manual grasping and opening of the lid.

According to yet another aspect of the invention, a flange extends outward from the surface in a direction opposed to the sidewall. The flange is spaced radially inward from and adjacent to the outer periphery and sized for receipt in the associated container opening.

According to a still further aspect of the invention, the flange has a maximum outward dimension adjacent a hinge means along said outer periphery, the flange tapering to a relatively constant dimension for assisting lid centering with respect to the associated container opening.

The principal advantage of the invention resides in an apparatus which effectively covers a container opening and yet has a covered utensil receiving means therein.

Another advantage of the subject invention is provided by the hinge means for pivotally retaining the lid with the associated container.

A further advantage of the subject invention is found in the lightweight material of construction of the container lid.

A still further advantage of the invention resides in centering the lid with respect to the container opening.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
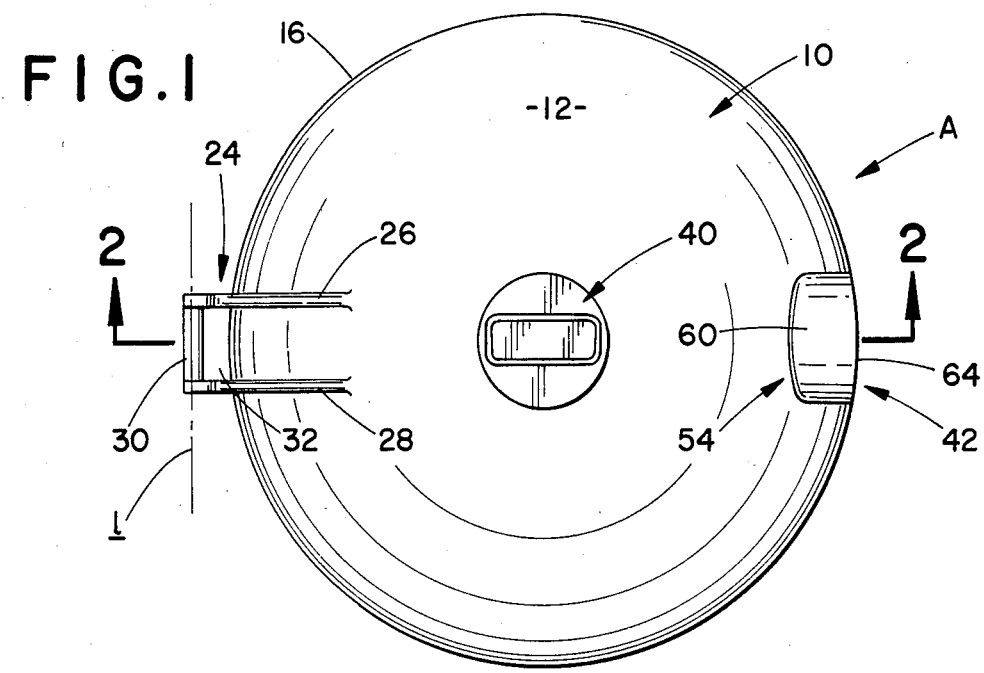
FIG. 1 is a plan view of the subject new container lid.

Referring now to the drawings wherein the showings are for purposes of illustrating the preferred embodiment of the invention only and not for purposes of limiting same, the FIGURES show a container such as a soup kettle or the like which incorporates the subject new lid. More particularly, the illustrated container lid A comprises a generally spherical or dome-shaped main body 10 having a first or upper face 12 and an opposed second or lower face 14. The main body has an outer periphery 16 of a predetermined diametrical dimension.

Figure 2:
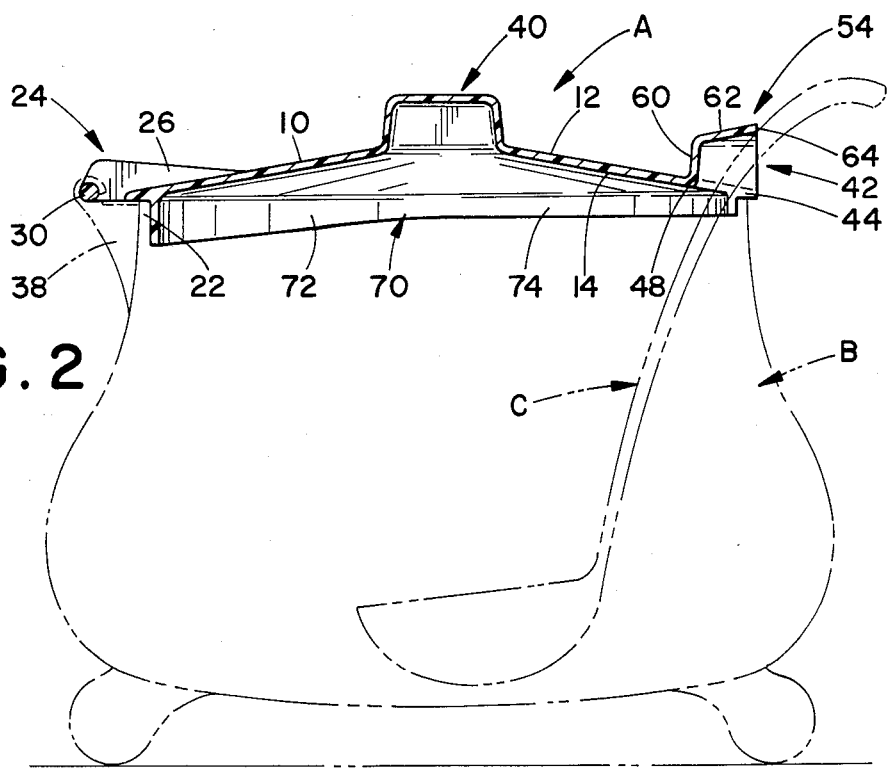
FIG. 2 is a cross-sectional view generally along the lines 2—2 of FIG. 1 with an associated container and utensil illustrated in phantom; and, FIG. 3 is an elevational view of the controller lid from the right-hand side of FIG. 2.

With additional reference to FIG. 2, lid A is shown in position on a container B such as a soup kettle. The outer diametrical dimensions of the main body is substantially greater than the container opening 22 so that the lid A extends outwardly beyond the container opening so that it is completely covered by the lid A. Typically, the container has an upper circumferential edge on which the outer periphery of main body 10 may rest when positioned in closing relation.

A hinge means 24 extends radially outward from the top surface 12. In the preferred embodiment, the hinge means includes a pair of radially extending walls 26, 28 with a transversely extending member 30 interposed therebetween. The member 30 is spaced radially outward from the outer periphery 16 to define an opening 32. As shown in FIG. 2, member 30 has a generally cylindrical configuration to allow it to serve as a hinge pin for pivotal movement of the container lid about the pivot axis 1. The member 30 is received in a surrounding flange 38 that extends from the container B. In this manner, the container lid is adapted for pivotal movement relative to the container, although other structures may be used without departing from the scope and intent of the subject invention.

A handle means 40 extends outwardly from the first face 12 of the body 10. Preferably, the handle means is centrally disposed on the body 10 in a position where it may be easily grasped. As shown, the handle means is a molded protrusion extending outwardly from upper face 12. Similar handle structures may equally well be used.

Figure 3:
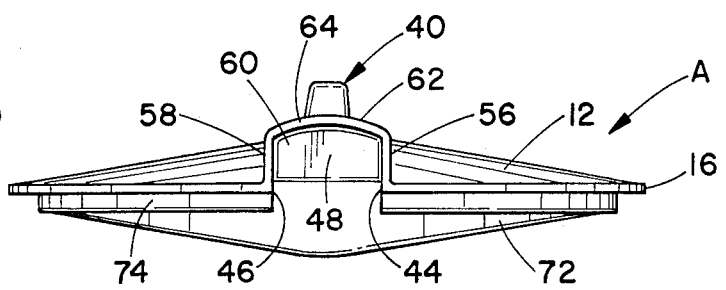

In the subject embodiment, a recess or notch-like opening 42 extends radially inward from the outer periphery 16 at an area generally opposite the hinge means 24. The recess includes a pair of generally radially extending edges 44, 46 (see FIG. 3) that are interconnected by transverse edge 48 to define a generally U-shaped opening. The recess is preferably no larger than necessary to closely receive a utensil handle such as the handle of a ladle C (FIG. 2). In this manner, if the fluid retained in the container is heated, the limited dimension of the recess inhibits escape of the heat therefrom yet allows receipt of the utensil handle in the lid closed position.

According to the subject invention, the recessor or opening 42 is provided with cover means to reduce the possibility of contaminants entering the container through the opening 42. In the preferred embodiment, the cover member 54 includes first and second radially extending sidewalls 56, 58 and a generally arcuate interconnecting wall 60 extending therebetween. The walls 56, 58, 60 can be, and preferably are, integrally formed to extend upwardly from the edges 44, 46, 48. Further, an upper wall 62 is joined to the upper edges of the sidewalls 56, 58 and the interconnecting wall 60. The wall 62 is spaced outwardly from the first face 12 of the spherical surface and is sized to completely cover the recess 42. Preferably, the radially outer edge 64 of wall 62 at least overlies the outer periphery 16 of the spherical surface. Desirably, the upper wall 62 is inclined downwardly from the outer edge 64 so that any foreign matter falling on the wall 62 is directed rearwardly away from the opening.

In the embodiment shown, the entire recess cover 54 is a molded protrusion extending outwardly from the first face 12. The upper wall 62 is sufficiently spaced from the first face to closely but freely accommodate the handle of ladle C.

A centering flange or rim 70 extends downwardly from the lower face 14 of the main body 10. The centering flange is generally circumferentially continuous and is spaced radially inward from the outer periphery 16. A first semi-circular portion 72 arcuately extends from adjacent the hinge means 24 circumscribing an arc of generally 180°. In the preferred embodiment shown, this first portion 72 tapers in both directions from a maximum outward dimension adjacent the hinge means 24 to reduced dimensions at points spaced approximately 90° from the hinge means 24 (see FIG. 3).

The remainder of the centering flange is defined by portions 74 which circumscribe an arc of approximately 90° from the ends of portion 72 to points adjacent the recess 42. The second portions 74, though, extend outwardly from the second face 14 a generally constant dimension. The flange is discontinuous adjacent the recess 42 in order to receive the utensil handle therethrough. Alternatively, the centering flange 70 could extend outwardly from the second face 14 adjacent the recess edges 44, 46, and 48.

As indicated above, the centering flange 70 is disposed radially inward from the outer periphery 16. This inward radial spacing concentrically positions the flange 70 relative to the container opening 22. The centering flange 70 is dimensioned to be closely received by the inner walls of the container B to assist in centering the lid relative to the container during pivotal closure. Further, the flange 70 inhibits entry of foreign matter into the container and more efficiently contains the heat therein.

The subject invention freely receives the handle from a utensil C through the container lid A in the closed position. The rear cover 54 prevents foreign matter from entering the fluid container opening adjacent recess 42 in the lid closed position. Further, the flange 70 accurately locates the lid with respect to the fluid container and reduces heat loss therefrom.

As described above, prior structures were formed from stainless steel or similar material. The closure lid A of the subject invention is preferably from a polymeric or plastic material. The lid can be molded as a unitary structure with the hinge means, handle means, flange, and recess cover all formed with the surface 10. Of course, other materials of construction may be used with equal success.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A lid adapted for an associated container having an opening extending therethrough, said lid comprising:
   a body having first and second opposed surfaces, and an outer periphery having a first dimension greater than an associated container opening dimension;
   said body having means adapted for receiving an associated utensil handle, said utensil handle receiving means including a recess extending radially inward from said outer periphery, said recess defined by first and second generally radially extending edges and a connecting edge interposed therebetween; and,
   said utensil handle receiving means including a cover overlying said recess, said cover including first and second generally radially extending sidewalls and an interconnecting wall extending therebetween, each of said sidewalls and interconnecting wall extending generally perpendicularly outward from said first surface, said cover further including a top wall operatively engaging said sidewalls and interconnecting wall, said top wall spaced outwardly fraom said first surface to facilitate receipt of an associated utensil handle.

2. The lid as defined in claim 1 further comprising handle means extending generally normally outward from said first surface for facilitating manual grasping of said lid.

3. The lid as defined in claim 1 further comprising hinge means adjacent said outer periphery for pivotally attaching said lid to an associated container and a flange extending generally perpendicularly outward from said second surface and spaced radially inward from and adjacent to said outer periphery for receipt in an associated container opening, said flange having a maximum outward dimension adjacent said hinge means and a reduced outward dimension adjacent said recess, said maximum dimension centering the body during pivotal closure.

4. The lid as defined in claim 3 wherein said flange is substantially continuous as it extends circumferentially from said first edge to said second edge without crossing said recess.

5. The lid as defined in claim 3 wherein said flange tapers from said maximum dimension to a relatively constant dimension in areas adjacent said recess.

6. The lid as defined in claim 1 wherein said top wall is inclined axially toward said first surface as it extends radially inward from said outer periphery.

7. A lid adapted for an associated container opening, said lid comprising:
a body defining a first generally spherical first surface and a second opposed surface, and an outer periphery of greater dimension than an associated container opening:
a radially inwardly extending recess in said first surface for receiving an associated utensil, a cover overlying said recess including first and second sidewalls extending normally outwardly from said first surface about said recess, and an upper wall extending from said sidewalls to substantially overlie said recess; a hinge means disposed generally opposite said recess for pivotally connecting said body to an associated container; and,
a flange extending outwardly from said body and spaced radially inwardly from said outer periphery and adapted to be closely received in an open end of an associated container, said flange having a maximum outward extension from said surface adjacent said hinge means and tapering to a lesses, substantially constant dimension in areas adjacent said recess.

8. The lid as defined in claim 7 wherein said flange is circumferentially continuous except adjacent said utensil receiving means.

9. The lid as defined in claim 7 further comprising a handle centrally received on said body to assist in opening and closing said lid.

* * * * *